(12) United States Patent
Rufer et al.

(10) Patent No.: US 11,860,013 B2
(45) Date of Patent: *Jan. 2, 2024

(54) MAGNETICALLY INDUCTIVE FLOWMETER HAVING ELECTRODE WITH PRESSURE MEASURING TRANSDUCER

(71) Applicant: Endress+Hauser Flowtec AG, Reinach (CH)

(72) Inventors: Heinz Rufer, Dornach (CH); Frank Voigt, Weil am Rhein (DE); Steffen Ziegler, Schopfheim (DE)

(73) Assignee: Endress+Hauser Flowtec AG, Reinach (CH)

( * ) Notice: Subject to any disclaimer, the term of this patent is extended or adjusted under 35 U.S.C. 154(b) by 285 days.

This patent is subject to a terminal disclaimer.

(21) Appl. No.: 17/288,739

(22) PCT Filed: Sep. 20, 2019

(86) PCT No.: PCT/EP2019/075365
§ 371 (c)(1),
(2) Date: Apr. 26, 2021

(87) PCT Pub. No.: WO2020/083583
PCT Pub. Date: Apr. 30, 2020

(65) Prior Publication Data
US 2021/0396557 A1 Dec. 23, 2021

(30) Foreign Application Priority Data
Oct. 26, 2018 (DE) .................... 10 2018 126 784.3

(51) Int. Cl.
*G01F 1/58* (2006.01)

(52) U.S. Cl.
CPC .............. *G01F 1/588* (2013.01); *G01F 1/584* (2013.01); *G01F 1/586* (2013.01)

(58) Field of Classification Search
None
See application file for complete search history.

(56) References Cited

U.S. PATENT DOCUMENTS

| 5,670,724 A | 9/1997 | Batey |
| 5,708,212 A * | 1/1998 | Batey ...................... G01F 1/586 73/861.12 |

(Continued)

FOREIGN PATENT DOCUMENTS

| CN | 202734880 U1 | 2/2013 |
| CN | 104685323 A | 6/2015 |

(Continued)

*Primary Examiner* — Harshad R Patel
(74) *Attorney, Agent, or Firm* — Christopher R. Powers; Endress+Hauser (USA) Holding, Inc.

(57) ABSTRACT

A magnetically inductive flowmeter for determining flow velocity and/or volume flow of a medium includes a measuring tube for conveying the medium, a magnetic field generating device and at least one electrode assembly, which is installed in the measuring tube in such a manner that it forms a galvanic contact with the medium, wherein the electrode assembly has an electrode body, wherein the electrode body is stylus shaped and has a front end surface, wherein a pressure measuring transducer is coupled with the electrode body, and wherein the pressure measuring transducer is contactable with the pressure acting on the front end surface.

13 Claims, 4 Drawing Sheets

(56) References Cited

U.S. PATENT DOCUMENTS

| | | | | |
|---|---|---|---|---|
| 6,598,487 B1 * | 7/2003 | Marsh | ................... | G01F 1/584 |
| | | | | 73/861.11 |
| 9,631,966 B2 * | 4/2017 | Voigt | ..................... | G01F 1/584 |
| 2022/0026250 A1 * | 1/2022 | Rufer | ................ | G01L 19/0092 |

FOREIGN PATENT DOCUMENTS

| | | |
|---|---|---|
| CN | 207622809 U1 | 7/2018 |
| DE | 102013102544 A1 | 9/2014 |
| DE | 102013109993 A1 | 3/2015 |
| EP | 0770855 A1 | 5/1997 |
| JP | 5692414 B2 | 4/2015 |
| WO | 2015036187 A2 | 3/2015 |

\* cited by examiner

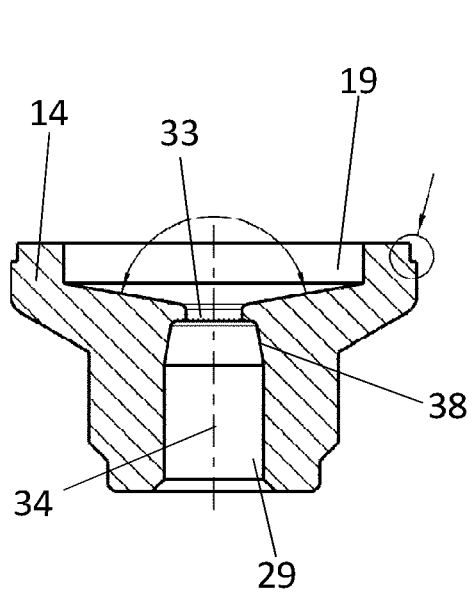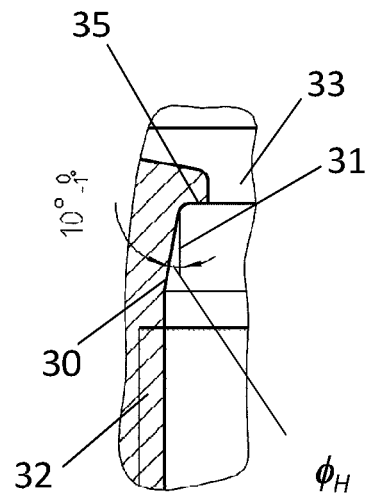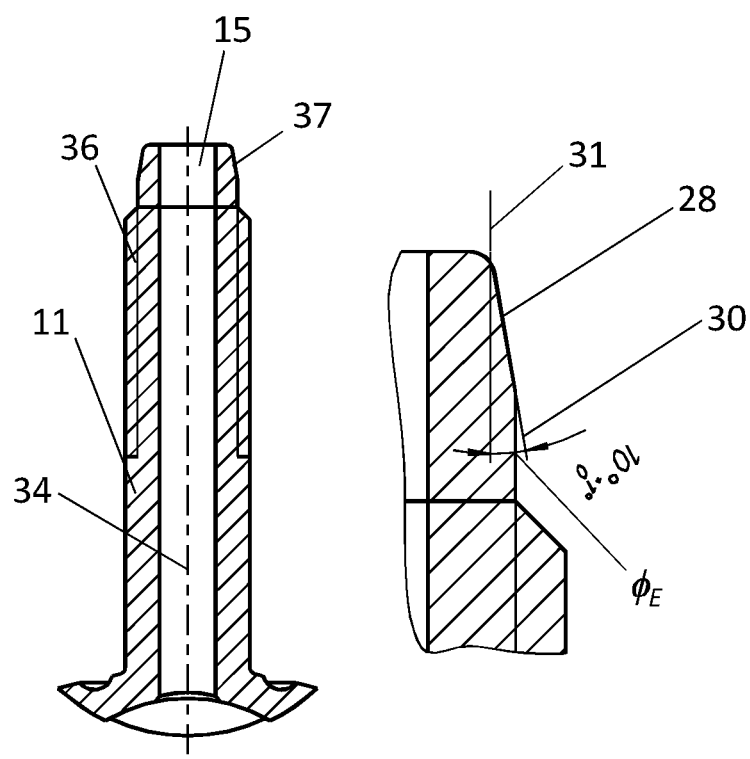
Fig. 4A
Fig. 4B
Fig. 5A
Fig. 5B

MAGNETICALLY INDUCTIVE FLOWMETER HAVING ELECTRODE WITH PRESSURE MEASURING TRANSDUCER

CROSS-REFERENCE TO RELATED APPLICATIONS

The present application is related to and claims the priority benefit of German Patent Application No. 10 2018 126 784.3, filed on Oct. 26, 2018, and International Patent Application No. PCT/EP2019/075365, filed on Sep. 20, 2019, the entire contents of which are incorporated herein by reference.

TECHNICAL FIELD

The present disclosure relates to magnetically inductive flowmeters, particularly to magnetically inductive flowmeters that include a pressure measuring transducer and to a method of manufacturing the same.

BACKGROUND

Magnetically inductive flowmeters are applied for determining flow velocity and/or volume flow of a medium in a measuring tube. A magnetically inductive flowmeter includes a magnetic field producing means, which produces a magnetic field extending perpendicularly to the transverse axis of the measuring tube. Used for such purpose are usually one or more coils. In order to implement a predominantly uniform magnetic field, pole shoes are supplementally so formed and placed such that the magnetic field lines extend over the total tube cross section essentially perpendicularly to the transverse axis. A measuring electrode pair applied at the lateral surface of the measuring tube senses an inductively produced electrical measurement voltage, which arises, when a conductive medium flows in the direction of the longitudinal axis in the presence of applied magnetic field. Since the registered measurement voltage depends according to Faraday's law of induction on the velocity of the flowing medium, flow velocity can be ascertained from the measured voltage and, with incorporation a known tube cross sectional area, the volume flow of the medium can also be ascertained.

For special applications involving monitoring irregularities and leakage locations, information relative to the pressure of the medium is desired supplementally to the volume flow. Known from EP0770855A1 is a magnetically inductive flowmeter, which has besides the measuring electrodes for ascertaining flow velocity two pressure measuring transducers, which are arranged in the wall of the measuring tube along a surface element. U.S. Pat. No. 5,670,724 teaches a flowmeter having a measuring electrode pair and a pressure measuring transducer arranged directly between the two measuring electrodes.

However, disadvantageous with these proposals is that an opening in the measuring tube must be provided for the installation of a pressure measuring transducer. Every additional opening represents, however, a location of potential leakage and should, thus, be avoided as much as possible.

SUMMARY

An object of the invention is to provide a magnetically inductive flowmeter, which has a pressure measuring transducer coupled with an electrode body. The object of the invention is achieved by the magnetically inductive flowmeter of the present disclosure.

A magnetically inductive flowmeter of the invention for ascertaining flow velocity and/or volume flow of a medium includes: a measuring tube for conveying the medium, a magnetic field producing means and at least one electrode assembly, which is installed in the measuring tube in such a manner that it forms a galvanic contact with the medium, wherein the electrode assembly has an electrode body, wherein the electrode body is stylus shaped and has a front end surface, wherein the flowmeter is characterized in that a pressure measuring transducer is coupled with the electrode body, wherein the pressure measuring transducer is contactable with pressure acting on the front end surface.

Previously, pressure measuring transducers introduced additionally into the measuring tube have been necessary for determining the pressure of the medium. Usually this has required extra openings in the measuring tube in addition to the openings needed for the measuring electrodes. The solution of the invention requires no additional openings in the measuring tube, since the pressure of the medium acting on the front end surface of the electrode body is directly sensed via a pressure measuring transducer coupled with the electrode body. In such case, it is especially advantageous that the pressure measuring transducer is in contact with the medium. There are, however, also pressure measuring transducers, which are exposed only indirectly to the medium and, thus, also only indirectly to the pressure of the medium. This is the case, for example, when air is present between the pressure measuring transducer and the medium.

The electrode assembly is an electrode forming assembly of at least two components, wherein at least a first component has the function and is embodied to sense a measurement voltage in the flowing medium and at least a second component has the function and is embodied to measure the pressure in the medium. The electrode assembly can also include components, which have the function and are adapted to determine other process parameters of the medium, such as, for example, the temperature, the viscosity and the pH value.

It is especially advantageous that the first component comprises an electrode body. In this context, the electrode body is an electrode known from conventional, magnetically inductive flowmeters. Such are usually embodied stylus shaped and can, thus, be installed and secured simply in the measuring tube. They have an electrode head with a front end surface, on which the pressure of the medium acts.

The second component is embodied as a pressure measuring transducer. According to the invention, the pressure measuring transducer is coupled to the electrode body. This means, on the one hand, that the pressure measuring transducer is mechanically connected with the electrode body either directly or indirectly via another component. On the other hand, this can mean that the pressure measuring transducer is in electrical contact with the electrode body. A coupling between the pressure measuring transducer and the electrode body is present, for instance, when the two components are so embodied that the pressure of the medium acting on the front face of the electrode head can load the pressure measuring transducer.

The pressure measuring transducer can be embodied in any way. The pressure measuring transducer can be embodied, for example, as strain gages, as a piezoresistive pressure sensor, as a piezoelectric pressure sensor, as a capacitive pressure sensor, as an inductive pressure sensor, as an optical pressure sensor, as a thermal pressure sensor or as a Hall pressure sensor.

The electrode assembly assumes the function of a fill level monitoring electrode, a reference electrode and/or a measuring electrode.

In an additional embodiment, the pressure measuring transducer includes a measuring membrane. It is especially advantageous that the pressure measuring transducer include a measuring membrane, since such a pressure measuring transducer is producible with the needed range and a coupling between pressure measuring transducer and electrode body is implementable without any additional adapter. Furthermore, pressure measuring transducers with measuring membranes cover the pressure range of interest for drinking water applications.

In an additional embodiment, the electrode body includes a bore open to the measuring tube. The bore serves, in such case, for receiving the medium and can be embodied either as a blind bore or as a passageway. In the case of a blind bore, the pressure measuring transducer can be placed at the end of the bore or, however, also on the inner surface of the bore. An electrode body with a passageway has an inlet end and an outlet end. In the case of a passageway, the pressure transducer can be placed on the inner surface of the bore. It is, however, especially advantageous, especially in the case of a pressure measuring transducer having a measuring membrane, when this is mounted at the outlet end.

In an additional embodiment, the bore is a passageway and forms an integrated pressure supply duct for conveying the medium. It is especially advantageous when the passageway is a pressure supply duct, since then a plurality of additional embodiments relative to the coupling of the pressure measuring transducer to the electrode body become possible. An advantageous embodiment, includes an adapter applied at the outlet end, via which other measuring transducers for registering process parameters are coupled with the electrode body.

The inside of the bore can have a coating, which optimizes movement of the medium into the bore and the wetting of the inside of the bore. The pressure supply duct, or the bore, does not have to be self-emptying, since pressure measuring transducers can, as is known, also sense the pressure of a medium indirectly.

In an additional embodiment, the electrode body is terminally connected with a hollow body. The hollow body is adapted to widen the pressure supply duct, so that measuring membranes, whose diameter is greater than the diameter of the bore, can be used. In this way, the area, on which the pressure of the medium is applied, can be increased and the accuracy of measurement of the pressure measurement improved.

The hollow body can simultaneously be embodied as an adapter for other measuring transducers, wherein the measuring transducer comprises a thermometer, a pH sensor or a sensor for ascertaining viscosity, the composition of the medium and/or other process parameters of the medium.

In an additional embodiment, a housing containing the pressure measuring transducer is connected with the hollow body by material bonding. It is especially advantageous that the housing be connected with the hollow body by material bonding, especially via a screw, weld, solder or adhesive connection. In this way, an effective electrical connection can be implemented between housing and hollow body. Depending on the production method used for the magnetically inductive flowmeter of the invention, a shape interlocking connection is provided between the terminal region of the electrode body and the hollow body for the purpose of obtaining an effective sealing. This prevents escape of the medium.

Advantageously, the connection is embodied as a shape interlocking connection, since then a replaceability of the individual components is assured. The shape interlocking connection includes, in such case, a sealing ring and, especially, a conical seal. The seal can also be electrically insulating, since the electrical connection with the electrode body is implementable via other contact locations, for example, screw threads.

The connection between the terminal region of the electrode body and the hollow body can, however, also be accomplished by material bonding. In such case, the connection is implemented after introduction of the electrode body into the hole in the measuring tube and securement of the electrode body to the measuring tube.

In an additional embodiment, an electrical contacting of the electrode body is implemented via the hollow body and/or the housing. This is advantageous, since then additional wiring, or an additional contacting apparatus, to the electrode body can be omitted.

In an additional embodiment, the housing includes at least one contacting apparatus, via which the electrode assembly is electrically contacted with a measurement and/or evaluation unit. Because of the contacting apparatus in the housing of the pressure measuring transducer, a single plug-in connection suffices for tapping the pressure signal and the measurement voltage.

In an additional embodiment, the magnetic field producing means includes at least one coil and at least one coil core positioned in the interior of the coil, wherein the coil core is embodied as a hollow cylinder and the electrode assembly is positioned in the interior of the coil core.

Magnetic field producing means are known, which comprise besides a coil having a coil core located in the interior supplementally a field-guide material in the outer region and at least one shielding element between a pole shoe and the field-guide material and/or above the field-guide material and the coil. The field-guide material and the shielding elements fulfill the goal of reducing disturbance- or stray fields. In contrast, the pole shoe is responsible for the in-coupling of the magnetic field into the medium. In this advantageous embodiment, the electrode assembly has the function of a fill level monitoring electrode and contains the magnetic field producing apparatus. In such case, measuring of the pressure can occur continuously or intermittently, e.g. when the magnetic field is switched off.

In an additional embodiment, the coil core has an inside, wherein insulation is provided between the inside and the housing. Since the electrical connection of the electrode body is implemented via the housing of the pressure measuring transducer, an insulation between the electrode assembly and the coil core is necessary. The insulation can be embodied as a coating or as a hollow-cylindrical, insulating sleeve.

In an additional embodiment, the electrode body includes an electrode head, wherein the electrode head has a contour. The contour is, in such case, embodied to exhibit a slit, which is shaped as a groove or a cross. It can, however, have any other structure, which leads to a simplifying of the mounting of the electrode body in the measuring tube. The contour is embodied in such a way that in the production of the magnetically inductive flowmeter of the invention a technician can affix the electrode body to the contour, in order then in the next step to push-on the insulating sleeve and secure the electrode body to the measuring tube with a nut.

In an additional embodiment, the electrode body comprises a fill level monitoring electrode and/or a reference electrode and/or a measuring electrode for sensing a measurement voltage in the medium.

In an additional embodiment, the electrode body is embodied as a peg electrode, a pointed electrode or a mushroom electrode.

In an additional embodiment, the electrode body has a basic terminal shape, which is embodied as a cone or a frustum, wherein the hollow body has a seat for the electrode body, which is embodied complementary to the basic terminal shape of the electrode body. In this way, a gas tightness can be implemented between electrode body and hollow body with little effort. Gas tightness is especially necessary, when an air volume is provided between pressure measuring transducer and the flowable medium.

Additionally, no lubricant is required, this being especially advantageous for applications in the food and beverage industry.

Advantageously, the hollow body has an internally threaded seat for the electrode body, in order, thus, to implement a releasable connection with the electrode body and its external thread provided in the terminal region of the electrode body.

In an additional embodiment, the basic terminal shape includes a surface element and a cone axis, which together form an angle $\phi_E$, wherein the angle $\phi_E$ lies between 5° and 25°. The region of the seat of the hollow body complementary to the terminal region of the electrode body includes a surface element and a cone axis, wherein the cone axis and the surface element define an angle $\phi_H$. The angle $\phi_H$ lies preferably between 5° and 25°. An especially stable connection can be implemented, when the difference $\phi_E - \phi_H$ lies between 0° and 4°. Such can be implemented, for example, by using different dimensional tolerances for the two angles in the production of the two components. Ultimately, the partially conical forming of the electrode body and a complementary seat in the hollow body can provide a durable force transmitting connection between the two components.

Advantageously, the hollow body and the electrode body are formed of the same material. In the case of sufficient pressure, then the electrode body and the hollow body can form a cold weld connection with one another.

A method for producing a magnetically inductive flowmeter of the invention includes method steps as follows:
A providing a measuring tube comprising a tube with liner;
B forming an opening in the tube and liner;
C introducing the electrode body into the opening;
F securing the electrode body by means of a nut;
G material bonded connecting of a housing containing a pressure measuring transducer with a hollow body having an internal thread;
H screwing the hollow body onto the screw thread of the electrode body;
J surrounding the electrode assembly with insulation formed as a hollow cylinder and a coil core formed as a hollow cylinder;
K pushing a coil onto the coil core, the insulation and the electrode assembly;
L connecting the electrode assembly with a measurement- and/or evaluation unit via a contacting apparatus.

The method can further comprise other method steps:

D sealing of the opening and/or securing the electrode body by means of an insulating sleeve;
E securing the electrode body to the contour;
I pushing on a pole shoe having an opening; and
M pushing on a field-guide material.

The method is, however, not limited to performing individual method steps in the sequence set forth here.

BRIEF DESCRIPTION OF THE DRAWINGS

The invention will now be explained in greater detail based on the appended drawing, the figures of which show as follows:

FIGS. 4A and 4B show a longitudinal section of the hollow body of the present disclosure and a detail view, respectively; and FIGS. 5A and 5B show a longitudinal section of the electrode body of the present disclosure and a detail view, respectively.

DETAILED DESCRIPTION

Figure 1:
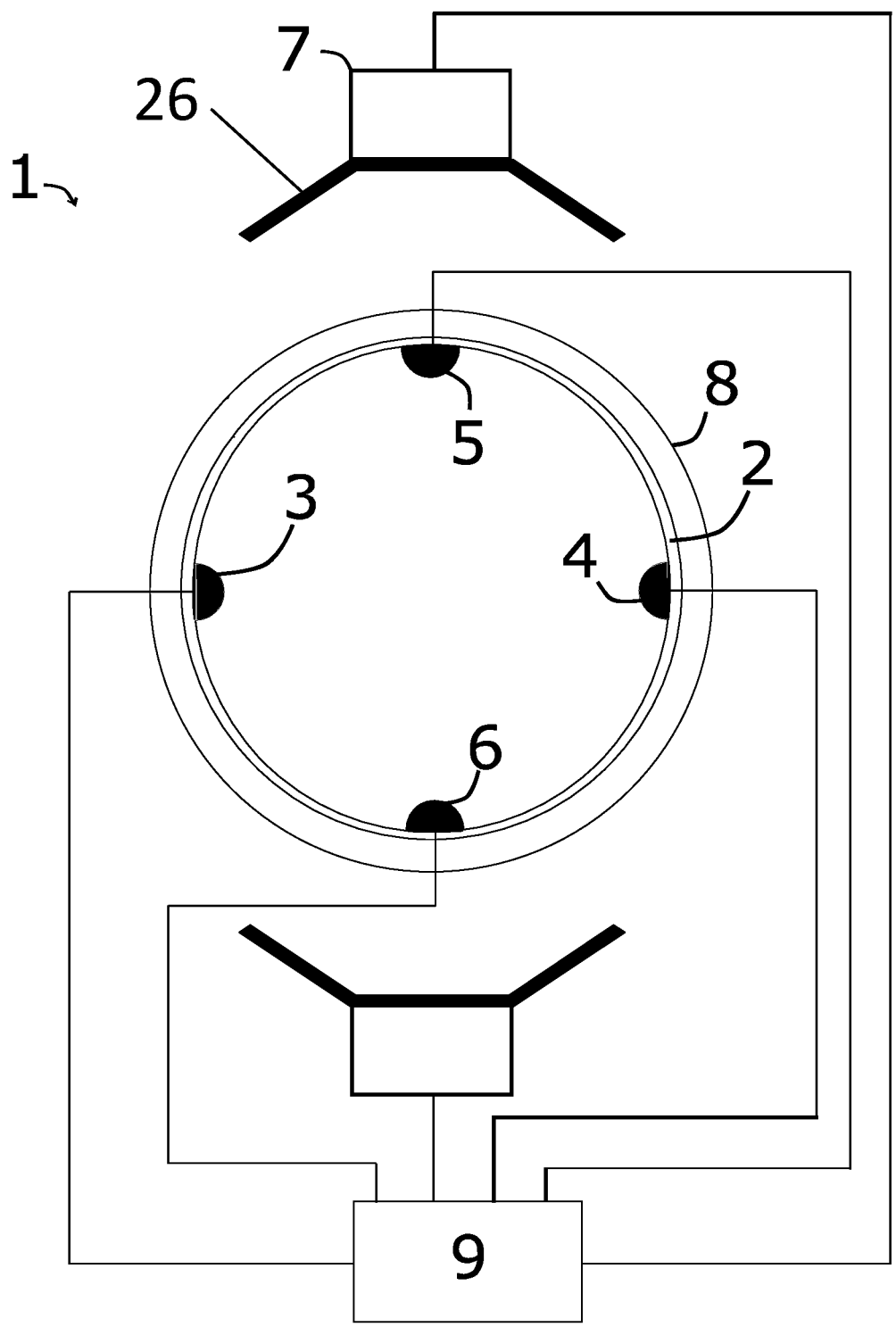
FIG. 1 shows a schematic view of a tube cross section of a magnetically inductive flowmeter of the state of the art.

FIG. 1 shows a known magnetically inductive flowmeter. The construction and the measuring principle of magnetically inductive flowmeters are basically known. An electrically conductive medium is conveyed through a measuring tube (1). A magnetic field producing means (7) is so arranged that its magnetic field lines extend perpendicularly to a longitudinal direction defined by the measuring tube axis. Suited as magnetic field producing means (7) is preferably a saddle coil or a pole shoe (26) with superimposed coil (23) and coil core (24). In the case of applied magnetic field, there arises in the measuring tube (1) a flow dependent potential distribution, which is sensed with two measuring electrodes (3, 4) mounted at the inner surface of the measuring tube (1). As a rule, the electrodes (3, 4) are arranged diametrically opposite one another and form an electrode axis, which extends perpendicularly to the magnetic field lines and to the longitudinal axis of the tube. Based on the measured voltage and taking into consideration the magnetic flux density, flow velocity and the tube cross sectional area, volume flow of the medium can be determined. In order to avoid short-circuiting of the measurement voltage on the measuring electrodes (3, 4) through the tube (8), the inner surface is lined with an insulating material e.g. in the form of a plastic liner (2). The magnetic field produced by a magnetic field producing means, for example, an electromagnet, results from a direct current of alternating polarity clocked by means of an operating unit. This assures a stable zero-point and makes the measuring insensitive to influences resulting from multiphase materials, inhomogeneities in the medium or low conductivity. A measuring unit reads the voltage between the measuring electrodes (3, 4) and outputs flow velocity and/or volume flow of the medium calculated by means of an evaluation unit. Usual magnetically inductive flowmeters have supplementally to the measuring electrodes (3, 4) two other electrodes (5, 6). On the one hand, a fill level monitoring electrode (5), which is mounted optimally at the highest point in the tube (8) and has only a minimum distance to the tube inner surface, serves to detect a partial filling of the measuring tube (1). This information is forwarded to the user and/or taken into consideration for ascertaining volume flow. Furthermore, a reference electrode (6), which is mounted usually diametrically opposite the fill level monitoring electrode (5), serves to assure a sufficient grounding of the medium.

Figure 2:
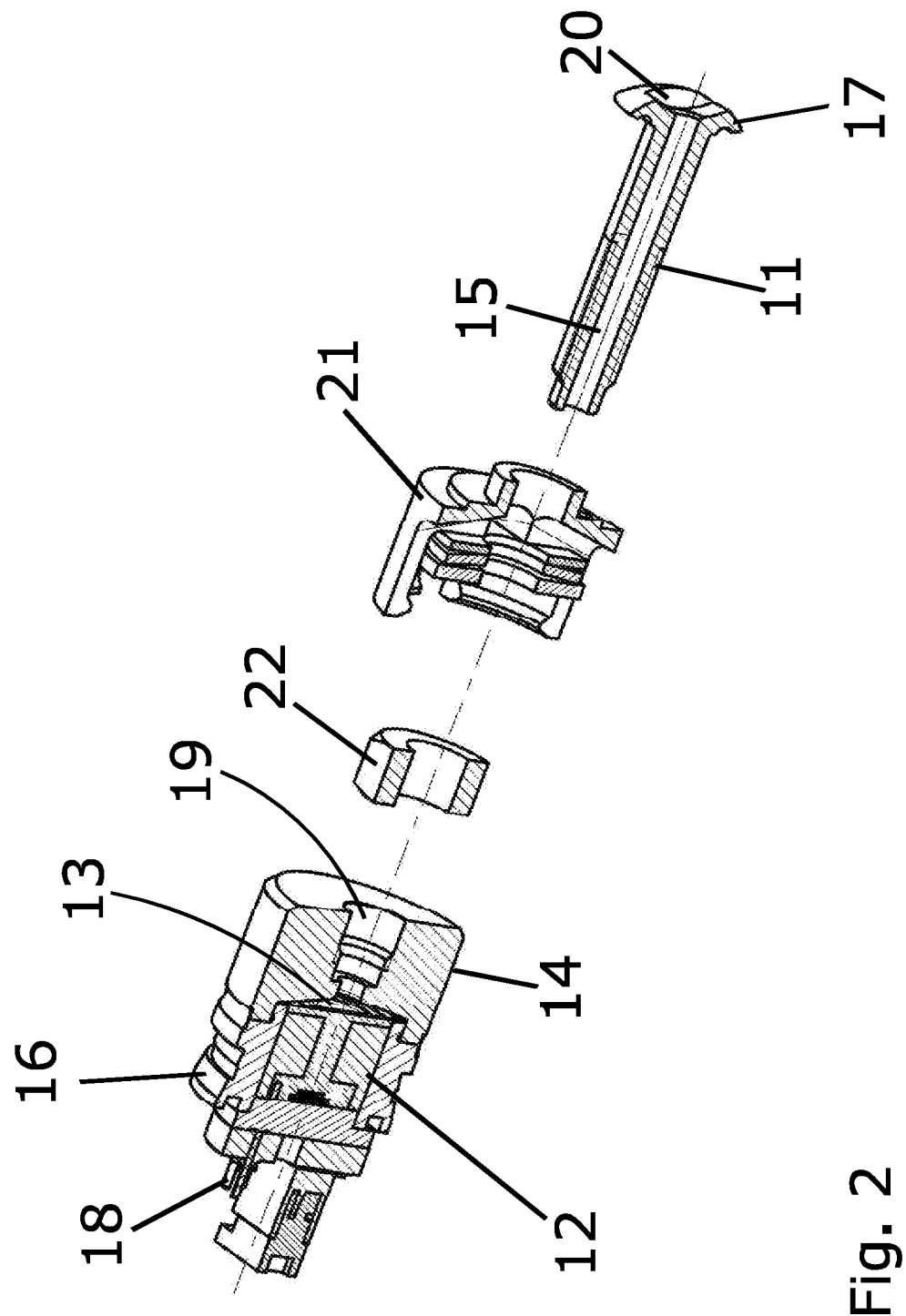
FIG. 2 shows a schematic, exploded view of an electrode assembly of the present disclosure.

As shown in FIG. 2, the pressure measuring transducer (12) is a part of the electrode assembly (10), which supplementally comprises at least one electrode body (11). The pressure measuring transducer (12) is, in such case, located in a housing (16), which is conductive and, thus, provides an electrical contact between electrode body (11) and a contacting apparatus (18) mounted terminally on the pressure measuring transducer (12). Thus, the entire electrode assembly (10) is in galvanic contact with the medium. In a further development, a hollow body (14) forms a hollow space (19) between the pressure measuring transducer (12) and the electrode body (11), or the outlet of the bore (15) embodied as pressure supply duct. Thus, the pressure of the medium acting on the front end surface of the electrode body (11) is led via the pressure supply duct to the measuring membrane (13), where it is detected. Furthermore, the housing (16) is connected by material bonding with the hollow body (14). The electrode body (11) includes an electrode head (17), wherein the electrode head (17) has a contour. The contacting apparatus (18) serves for tapping the pressure of the medium converted into an electrical, or digital, signal for a measurement- and/or evaluation unit (9). In such case, the contacting apparatus (18) includes at least one pin, which is in an electrical contact with the housing (16) and, thus, with the electrode body (11). The hollow body (14) is embodied in such a way that it forms, on the one hand, a hollow space (19) between measuring membrane (13) and electrode body (11) and, on the other hand, seals the electrode body (11) in such a manner that the medium flowing through the pressure supply duct cannot escape via the contact area. The electrode body (11) includes an external screw thread, which serves to secure the electrode body (11) to the measuring tube (1) and to connect to the hollow body (14), which has an internal thread.

Figure 3:
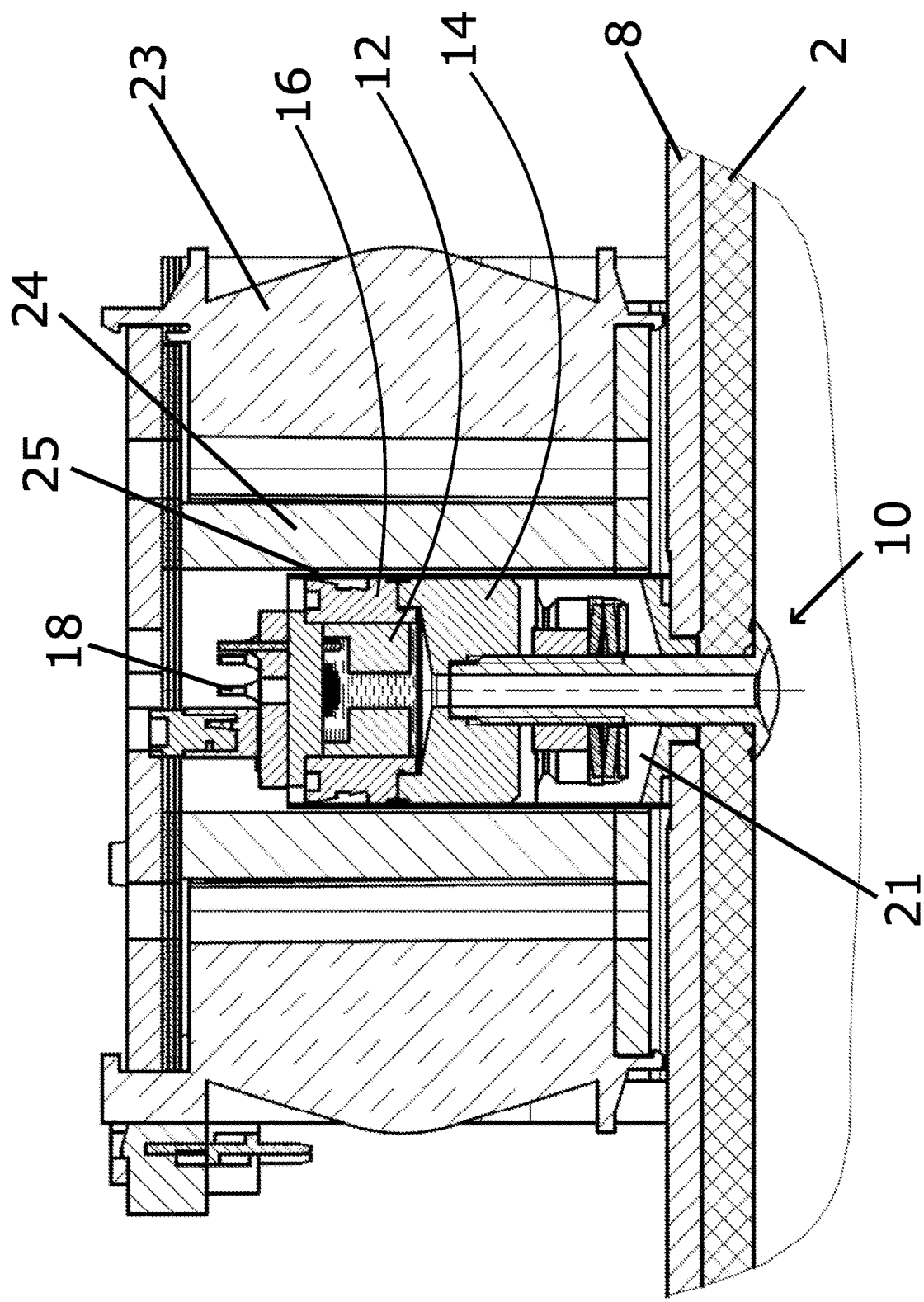
FIG. 3 shows a schematic view of a longitudinal section of a magnetically inductive flowmeter of the present disclosure.

The magnetically inductive flowmeter shown in FIG. 3 includes an electrode assembly (10), which comprises a stylus shaped electrode body (11) having an electrode head (17) having a contour (20), an insulating sleeve (21), a nut (22), a hollow body (14) and a pressure measuring transducer (12). The electrode body (11) includes a screw thread, which serves, on the one hand, for securing the electrode body (11) to the measuring tube (1) with a nut (22), and, on the other hand, for connecting to the hollow body (14) and/or the pressure measuring transducer (12). For mounting the electrode assembly (10) to the measuring tube (1), the electrode body (11) is led through an opening provided in the tube (8) and liner (2) and secured with an insulating sleeve (21) and a nut (22) outside of the tube. The hollow body (14) has an internal thread, such that the hollow body (14) with the shape interlocked pressure measuring transducer (12) can be screwed onto the screw thread of the electrode body (11). The hollow body (14) is embodied to produce a sealed contact to the electrode body (11), so that the medium flowing through the bore cannot escape at the contact location between the two components. The seal is preferably embodied as a conical seal. The electrode assembly (10) shown in FIG. 3 is embodied as a fill level monitoring electrode (5) and is arranged in the interior of a coil (23), especially in the interior of a coil core (24). For this further development, it is necessary to provide the coil core (24) as a hollow cylinder and to insulate the electrode assembly (10) electrically from the magnetic field producing means (7), especially the coil (23) and the coil core (24). The insulation (25) can be implemented by a coating of the inside of the coil core (24) with an electrically insulating material or by the introduction of an electrically insulating, hollow cylinder between the coil core (24) and the electrode assembly (10).

The hollow body (14) shown in FIG. 4 has a first end and a second end. Provided on the first end is an opening, which forms together with the housing of the pressure measuring transducer a hollow space (19). The second end includes a seat (29) for the electrode body. The seat (29) includes an internal thread (32), which serves to connect the hollow body (14) releasably with the electrode body. The seat (29) is at least partially cylindrically embodied and includes a region, which tapers conically narrower in the direction of the hollow space (19) and which is formed complementary to the terminal region of the electrode body. In the tapering region of the seat (29), seat (29) assumes the shape of a frustum. Seat (29) can have on its inlet end an additional region, which is embodied conically, in order to facilitate introduction of the electrode body. The hollow space (19) and the seat (29) are connected together via a passageway (33). The passageway (33) and the seat (29) have a shared axis (34) of symmetry.

The detail view shows a section of the longitudinal section of the hollow body (14). The seat (29) has an inner diameter, which continuously decreases in the direction of the hollow space (19). In this way, the seat (29) assumes in the region at least partially the shape of a frustum. The seat (29) includes a stop surface (35) for the electrode body. The conical tapering includes a surface element (30), which intersects the stop surface (35). A vertical line from the stop surface (35), or the cone axis (31), and the surface element (30) form an angle $\phi_H$, which preferably lies between 5° and 25°. In the case of the shown embodiment, $\phi_H = 10°$, with a dimensional tolerance of −1°.

FIG. 5 shows an electrode body (11) of the invention with a bore (15), which is embodied as a pressure supply duct. The electrode body (11) is at least partially embodied as a hollow cylinder. In a region, the electrode body (11) has an external thread (36), which serves to connect the electrode body (11) releasably with the hollow body (14). In a terminal region of the electrode body (11), which goes into the seat of the hollow body (14), the outer diameter of the electrode body (11) becomes less in the direction of the hollow body (14). The terminal region is conically shaped and assumes the basic terminal shape of a frustum having a bore (15), wherein the bore (15) and the frustum have a shared axis of symmetry (34). In the assembled state, the lateral surface (37) of the terminal region is in contact with the hollow body. Upon the screwing together of the electrode body (11) and the hollow body, the lateral surface (37) comes into contact with the inner lateral surface 38 of the hollow body (14). If further force is exerted on the electrode body (11), then a deformation of the terminal region of the electrode body (11) in the direction of the symmetry axis (34) results. The electrode body (11) does not necessarily have to contact the stop surface (35). A gap can remain between the stop surface of the hollow body and the electrode body (11).

The detail view shows the terminal region of the electrode body (11). The outer diameter of the electrode body (11) decreases in the direction of the terminal end, while the diameter of the bore (15) remains constant. The result is a decrease of the wall thickness in the terminal region. The transition from the terminal end surface to the lateral surface (37) of the electrode body (11) is rounded. A surface element (30) and the cone axis (31) of the basic terminal shape form an angle $\phi_E$, which preferably lies between 5° and 25°. The angles $\phi_H$ and $\phi_E$ are so tailored to one another that the difference $\phi_E-\phi_H$ lies between 0° and 4°. In the illustrated embodiment, the angle $\phi_E=10°$ with a dimensional tolerance of +1°.

The invention claimed is:

1. A magnetically inductive flowmeter for determining flow velocity and/or volume flow and pressure of a medium, the flowmeter comprising:
a measuring tube adapted to convey the medium;
a magnetic field generating means comprising at least one coil and at least one coil core disposed in an interior of the at least one coil, wherein the at least one coil core is embodied as a hollow cylinder; and
at least one electrode assembly disposed in the measuring tube as to form a galvanic contact with the medium, the at least one electrode assembly comprising an electrode body, which is generally stylus-shaped and has a front end surface, and a pressure measuring transducer coupled with the electrode body, wherein the pressure measuring transducer is configured to be acted upon by a pressure acting on the front end surface,
wherein the at least one electrode assembly is disposed in the interior of the at least one coil core,
wherein the electrode body includes a bore open to the measuring tube, which bore defines a passageway that forms an integrated pressure supply duct for conveying the medium, and
wherein the electrode body is connected terminally with a hollow body.

2. The flowmeter of claim 1, wherein the pressure measuring transducer includes a measuring membrane.

3. The flowmeter of claim 1, wherein the at least one electrode assembly further comprises a housing containing the pressure measuring transducer, the housing connected to the hollow body.

4. The flowmeter of claim 3, wherein an electrical contacting of the electrode body is effected via the hollow body and/or the housing.

5. The flowmeter of claim 3, wherein the housing includes at least one contacting apparatus via which the electrode assembly is electrically contacted with a measurement and/or evaluation unit.

6. The flowmeter of claim 3, wherein the housing is connected to the hollow body by material bonding.

7. The flowmeter of claim 1, wherein the at least one coil core has an interior surface, and wherein the at least one electrode assembly further comprises insulation disposed between the interior surface and the housing, which is disposed within the at least one coil core.

8. The flowmeter of claim 1, wherein the electrode body includes an electrode head, wherein the electrode head has a contour.

9. The flowmeter of claim 1, wherein the electrode body comprises a fill level monitoring electrode and/or a reference electrode and/or a measuring electrode configured to sense a measurement voltage in the medium.

10. The flowmeter of claim 1, wherein the electrode body is configured as a peg electrode, a pointed electrode or a mushroom electrode.

11. The flowmeter of claim 1, wherein the electrode body has a basic terminal shape embodied as a cone or a frustum, and wherein the hollow body includes a seat adapted for the electrode body, which seat is configured complementary to the basic terminal shape of the electrode body.

12. The flowmeter of claim 11, wherein the basic terminal shape includes a surface element and a cone axis, which together form an angle of between 5° and 25°.

13. The flowmeter of claim 1, wherein the electrode body comprises a fill level monitoring electrode configured to detect a partial filling of the measuring tube and/or a reference electrode configured to ensure sufficient grounding of the medium.

* * * * *